(12) United States Patent
Camorera Gangoiti

(10) Patent No.: US 10,044,249 B2
(45) Date of Patent: Aug. 7, 2018

(54) ROTARY ELECTRIC MACHINE

(71) Applicant: Santiago Camorera Gangoiti, Vizcaya (ES)

(72) Inventor: Santiago Camorera Gangoiti, Vizcaya (ES)

( * ) Notice: Subject to any disclaimer, the term of this patent is extended or adjusted under 35 U.S.C. 154(b) by 196 days.

(21) Appl. No.: 15/247,294

(22) Filed: Aug. 25, 2016

(65) Prior Publication Data

US 2018/0062489 A1 Mar. 1, 2018

(51) Int. Cl.
*H02K 7/20* (2006.01)
*H02K 16/00* (2006.01)
*H02K 1/27* (2006.01)
*H02K 3/46* (2006.01)

(52) U.S. Cl.
CPC ........... *H02K 16/00* (2013.01); *H02K 1/2706* (2013.01); *H02K 3/46* (2013.01)

(58) Field of Classification Search
CPC ...... H02K 21/12; H02K 21/14; H02K 1/2706; H02K 16/025
USPC ....... 310/112–114, 126, 156.35–156.37, 266
See application file for complete search history.

(56) References Cited

U.S. PATENT DOCUMENTS

| | | | | |
|---|---|---|---|---|
| 8,901,761 | B2* | 12/2014 | Hemmelmann | H02K 16/00 290/44 |
| 8,968,042 | B2* | 3/2015 | Calverley | B63H 23/24 310/114 |
| 2009/0072645 | A1* | 3/2009 | Quere | H02K 7/116 310/114 |
| 2009/0278415 | A1* | 11/2009 | Park | H02K 16/00 310/156.08 |

FOREIGN PATENT DOCUMENTS

| | | |
|---|---|---|
| CN | 203537199 U | 4/2014 |
| DE | 10101377 A1 | 7/2002 |
| DE | 202011050744 U1 | 1/2012 |
| GB | 820280 A | 9/1959 |
| WO | 2013099008 A1 | 7/2013 |

\* cited by examiner

*Primary Examiner* — Thanh Lam
(74) *Attorney, Agent, or Firm* — Lucas & Mercanti, LLP

(57) ABSTRACT

The present invention relates to a rotary electric machine formed by a stator assembly and a rotor assembly arranged such that they rotate relatively with respect to one another, the stator assembly comprising at least a first stator and a second stator, and the rotor assembly comprising at least a first rotor and a second rotor, the first stator, the first rotor, the second stator and the second rotor being arranged consecutively in a coaxial distribution.

5 Claims, 4 Drawing Sheets

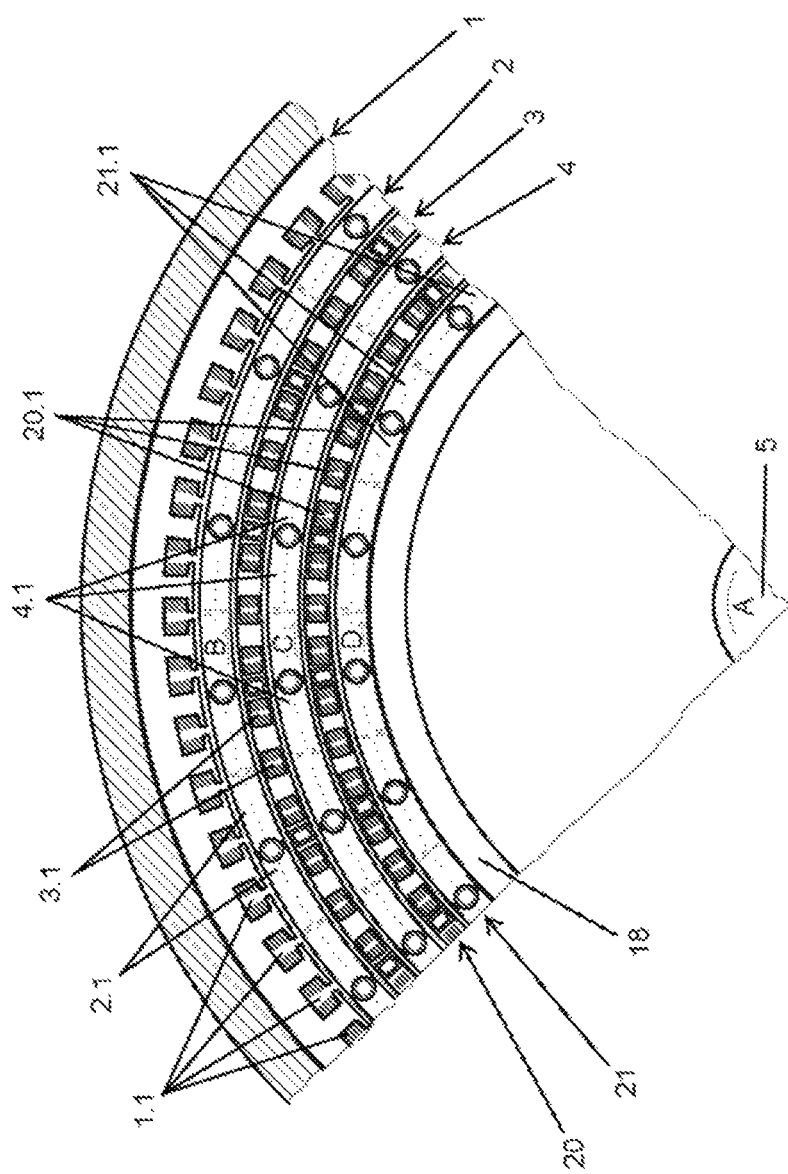

ROTARY ELECTRIC MACHINE

FIELD OF THE ART

The present invention relates to the sector of rotary electric machines for producing electric power (generator) or for obtaining rotational movement (motor) by means of a rotor and a stator between which a mobile or variable magnetic induction field is established, proposing a machine of this type which comprises at least two rotor-stator pairs, the assembly of which allows obtaining an amount of electric energy or torque and power several fold higher than those obtained by means of conventional machines of that type, with dimensions that are virtually similar to the dimensions of a conventional electricity generator or electric motor formed by only one stator and one rotor.

PRIOR ART

Electric power generators consisting of an inductor and an armature are widely known today, the inductor comprising permanent magnets or windings that are powered by an electric current and form magnetic fields, and the armature comprising windings through which the magnetic fields of the magnets or the windings of the inductor pass when the relative movement between the inductor and the armature is actuated. The relative movement between the inductor and the armature is usually actuated by means of a rotating shaft driven by operating means such as a motor, a turbine, etc.

Attempts have been made over time to improve the performance of electric power generators by means of different configurations, seeking an increased amount of generated electric power. In that sense, electric power generators with an inductor and an armature rotating in opposite directions are known, for example. The relative speed between the inductor and the armature is thus increased, providing greater electric power generating capacity.

However, this type of configuration requires a high degree of precision in manufacturing and assembly due to the vibrations produced in the electric power generator as the number of masses rotating in the functional assembly increases, the masses furthermore rotating at high revolutions and in opposite directions.

Another alternative to achieve a higher production of electricity is to build generators with a larger inductor and armature, or also to connect two or more generators in series providing a sum of productions, increasing the amount of electric power obtained. These solutions, however, entail increased manufacturing costs and furthermore require a larger space for installation, which is counterproductive for assembly in places with little space, such as in motor vehicles, for example.

OBJECT OF THE INVENTION

In order to achieve the objective of obtaining a higher electricity production without the mentioned problems or of obtaining a higher torque and power in the case of electric motors, the present invention proposes a rotary electric machine which, in the same operating conditions and with dimensions virtually equivalent to the dimensions of a conventional electricity generator or electric motor, allows generating a higher amount of electric power or a higher torque than conventional generators or motors formed by a rotor and a stator, one of them as an inductor and the other as an armature.

The rotary electric machine object of the invention comprises a stator assembly and a rotor assembly, one of them acting as an armature and the other acting as an inductor, arranged such that they rotate relatively with respect to one another, the rotor assembly being assembled on a shaft in an integrally rotating manner. The stator assembly comprises at least a first stator and a second stator and the rotor assembly comprises at least a first rotor and a second rotor, the first stator, the first rotor, the second stator and the second rotor being arranged consecutively in that order in a coaxial distribution.

With this arrangement, considering an application in which the object of the invention operates like an electricity generator, for example, when the rotor assembly rotates with respect to the stator assembly, electricity generation is achieved due to the influence of a mobile magnetic field between the first stator and the first rotor, like in a conventional generator, and another electricity generation is achieved due to the influence of a mobile magnetic field between the second stator and the second rotor, like in a conventional generator; but furthermore, the influence of a mobile magnetic field also occurs between the first stator and the second rotor, giving rise to complementary electricity production, and the influence of a mobile magnetic field in turn occurs between the second stator and the first rotor, giving rise to another complementary electricity production; therefore a significantly higher electricity production is achieved with this generator than the production that can be obtained using independent conventional generators the joint functional assembly of which is equivalent to that of this proposed generator. This is furthermore because, due to the nature and magnitude of the rotating magnetic field produced by two magnetic poles of different signs, in the winding of the second stator located in the space comprised between the first rotor and the second rotor, complementary electricity generation occurs, having a greater magnitude than that occurring in the first stator due to the influence of the first rotor, as a result of the conductors of the winding of the second stator being located inside said space, in which the dispersive flux has been furthermore considerably reduced, increasing the useful flux.

The mentioned arrangement can also be used for an application as an electric motor, obtaining, where appropriate, an operation which, due to the same reasons of two or more stator and rotor assemblies being arranged concentrically, increases the motor torque and power obtained.

The mentioned arrangement furthermore results in a compact structural assembly of the generator or motor, taking up a small space despite the assembly of functional elements it comprises; the first stator being arranged on the inner portion of an outer casing of the generator or motor, thereby also achieving savings in structural elements and greater ease of assembly, since it is not necessary to incorporate any accessory structure for holding said first stator.

When assembled, the first rotor and the second rotor are firmly arranged together, at one end, on the shaft of the generator or motor, through a sleeve fixed to the shaft. This configuration provides the assembly with structuring that prevents vibrations during the operation of the generator or motor. Nevertheless, the first rotor and the second rotor can be firmly assembled in an individual manner on the shaft of the generator or motor.

Additionally, at the other end, the first rotor is arranged with respect to the outer casing by means of a rotating assembly through rolling means allowing relative rotation between both, whereas the second rotor is attached to the shaft of the generator or motor by means of another sleeve fixed to the shaft.

The second stator is in turn arranged with respect to the shaft by means of a rotating assembly through rolling means allowing relative rotation between both, said second stator being firmly attached with respect to the outer casing of the generator or motor.

The assembly of the functional assembly of the generator or motor additionally comprises in the inner portion of the concentric stator and rotor distribution a cylinder integrally attached to the second rotor through the inner portion thereof, such that they both rotate together, said inner cylinder being made of a ferromagnetic material for the purpose of providing continuity and completing the magnetic circuit and for preventing or minimizing magnetic energy losses of the polar parts.

DESCRIPTION OF THE DRAWINGS

FIG. 4 is a partial cross-section view of the rotary electric machine of the preceding figure.

DETAILED DESCRIPTION OF THE INVENTION

Figure 1:
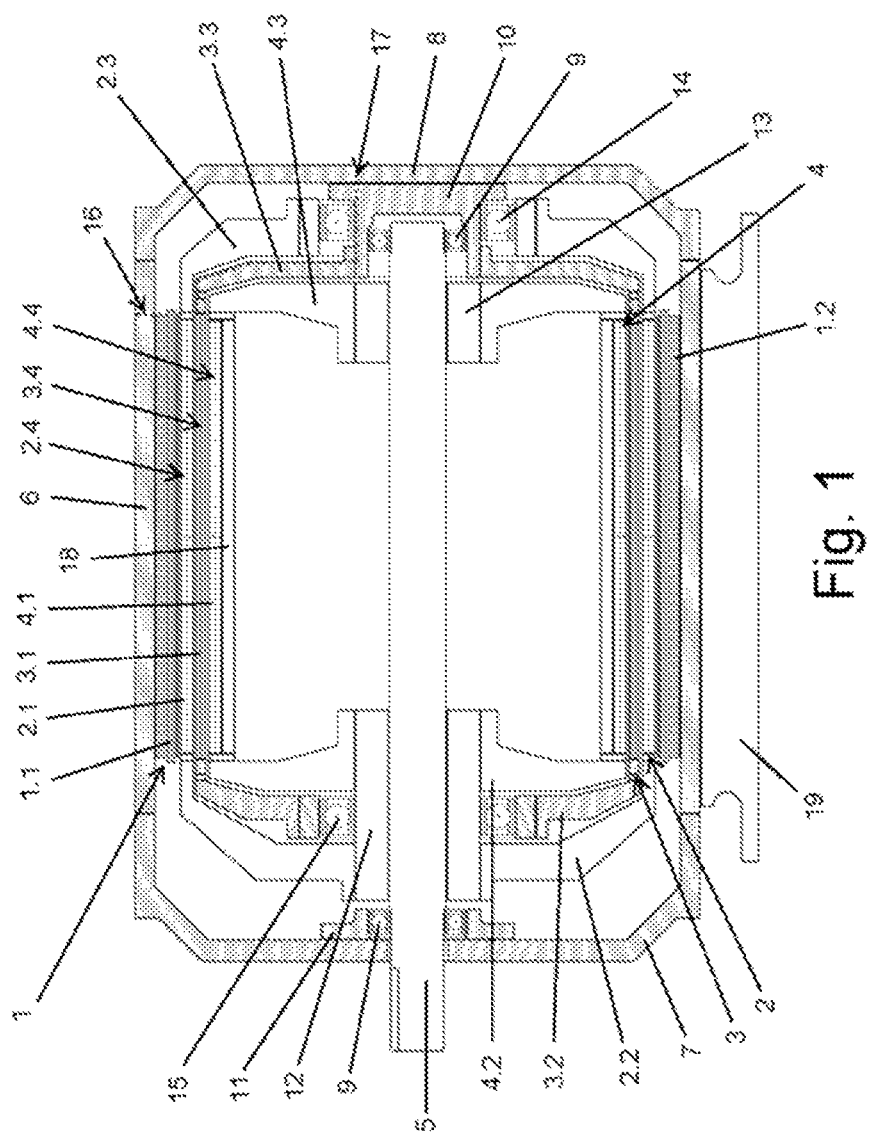
FIG. 1 shows a longitudinal section view of an embodiment of a rotary electric machine according to the invention.
Figure 2:
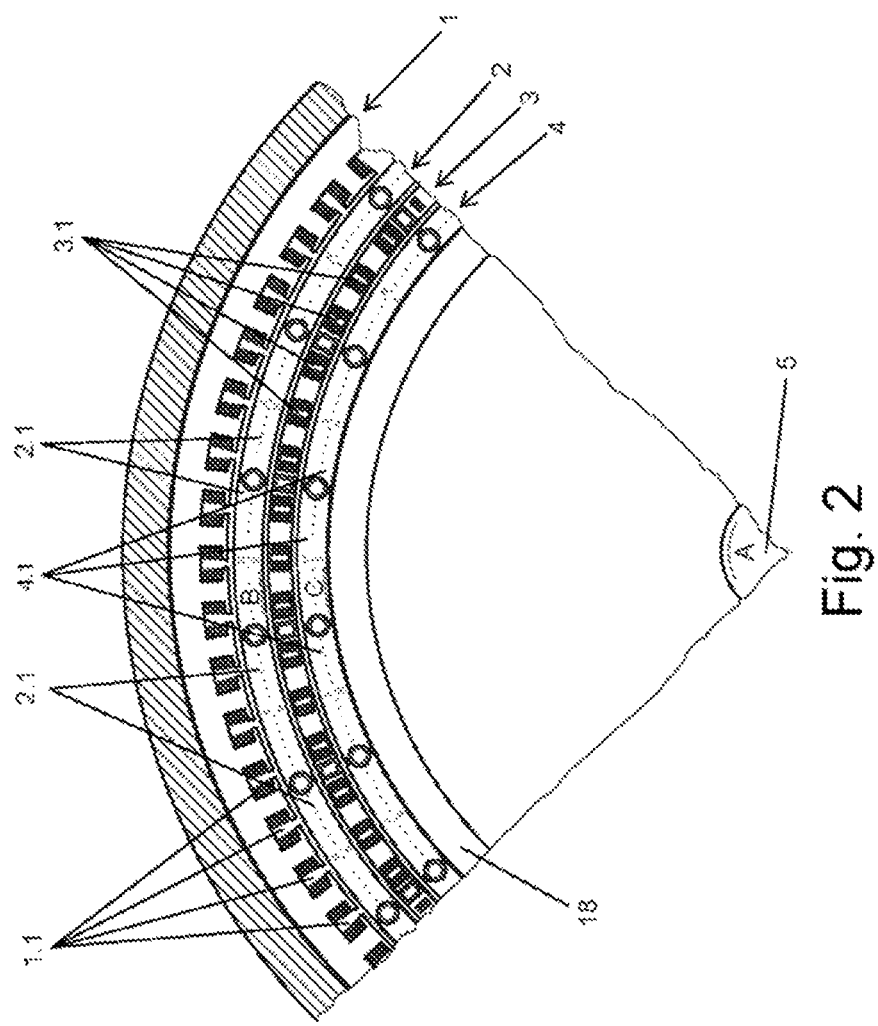
FIG. 2 shows a partial cross-section view of the rotary electric machine of the preceding figure.

The present invention relates to a rotary electric machine, which can be a generator for the production of electricity or a motor, with a functional assembly which, as seen in FIGS. 1 and 2, is made up of a stator assembly comprising at least a first stator (1) and a second stator (3), and a rotor assembly comprising at least a first rotor (2) and a second rotor (4), the rotor assembly being assembled on a shaft (5) in an integrally rotating manner. The rotor assembly is arranged with respect to the stator assembly such that the first rotor (2) and the second rotor (4) can rotate with respect to the first stator (1) and the second stator (3).

The functional assembly comprises a multiple number of stators (1, 3), which can be two or more, and the same number of rotors (2, 4), which are alternated consecutively and coaxially, according to a concentric distribution from the outside in, comprising the first stator (1), the first rotor (2), the second stator (3) and the second rotor (4), consecutively, said functional assembly being housed inside an outer casing comprising a cylindrical central portion (6) and two end covers (7) and (8), between which there is rotationally assembled the shaft (5) projecting outwards through one of the ends.

According to the non-limiting embodiment depicted in FIGS. 1 and 2, the first stator (1) comprises a winding (1.1) which is incorporated in a cylindrical body (1.2) fixed on the inner portion of the cylindrical central body (6) of the outer casing.

The first rotor (2) in turn comprises permanent magnets (2.1), two end structures (2.2, 2.3) and a cylindrical body (2.4), the cylindrical body (2.4) being attached at its ends to the end structures (2.2, 2.3) and the permanent magnets (2.1) being incorporated in the cylindrical body (2.4), coaxially with respect to the shaft (5) and radially inwards with respect to the winding (1.1) of the first stator (1), with freedom of rotation by means of a minimum gap between them.

The second stator (3) comprises a winding (3.1), two end structures (3.2, 3.3) and a cylindrical body (3.4), the cylindrical body (3.4) being attached at its ends to the end structures (3.2, 3.3) and the winding (3.1) being incorporated in the cylindrical body (3.4), also coaxially with respect to the shaft (5) and, where appropriate, radially inwards with respect to the permanent magnets (2.1) of the first rotor (2), likewise with freedom of rotation by means of a minimum gap between them.

The second rotor (4) comprises permanent magnets (4.1), two end structures (4.2, 4.3) and a cylindrical body (4.4), the cylindrical body (4.4) being attached at its ends to the end structures (4.2, 4.3) and the permanent magnets (4.1) being incorporated in the cylindrical body (4.4), also coaxially with respect to the shaft (5) and radially inwards with respect to the winding (3.1) of the second stator (3), with freedom of rotation by means of a minimum gap between them.

As a result of the arrangement of the assembly thus formed and assembled, in the case of a functional application as an electricity generator, when the shaft (5) and thereby the rotors (2, 4) rotate, a significantly higher electric power generation is obtained than with independent conventional electric generators because due to the relative rotation of the first rotor (2) with respect to the first stator (1), i.e., due to the shift in the magnetic field of the permanent magnets (2.1) with respect to the winding (1.1), electricity generation occurs like in a conventional generator; and due to the relative rotation of the second rotor (4) with respect to the second stator (3), i.e., due to the shift in the magnetic field of the permanent magnets (4.1) with respect to the winding (3.1), another electricity generation occurs like in a conventional generator.

However, additionally, due to the influence of the mobile magnetic field of the permanent magnets (2.1) of the first rotor (2) with respect to the winding (3.1) of the second stator (3), complementary electricity generation occurs, and in turn, due to the influence of the mobile magnetic field of the permanent magnets (4.1) of the second rotor (4) with respect to the winding (1.1) of the first stator (1), complementary electricity generation also occurs; and furthermore, due to the nature and magnitude of the rotating magnetic field produced by the rotors (2) and (4), another electricity generation occurs in the second stator (3), since the shift in the rotating magnetic field affecting same is produced between two magnetic polar parts the fields of which are of opposite signs and furthermore with a considerably smaller dispersive flux, increasing the useful flux; all this as a whole results in a higher electricity production than that of the sum of independent conventional generators, each of them with a stator and a rotor. Furthermore, said increased electricity production is obtained with a structural assembly of the generator that is roughly the size of a conventional generator made up of a stator and a rotor, making this generator object of the invention advantageous for applications in which it must be located in small spaces.

In the case of the functional application as an electric motor, due to the same reasons of the relationship between several stators (1, 3) and several rotors (2, 4) being concentrically distributed, higher torque and power are achieved than with independent conventional electric motors having structures equivalent to the structure of the functional assembly according to the invention.

The shaft (5) is rotationally assembled with respect to the end covers (7, 8) of the outer casing of the generator or motor by means of rolling means (9), such as bearings, journals, etc., arranged between the shaft (5), and supports (10, 11) that are attached to the mentioned end covers (7, 8) of the outer casing, such that by releasing said end covers (7, 8) with respect to the respective supports (10, 11) attached to them, the inside of the generator or motor can be accessed for any repair or maintenance operation without having to remove the rolling means from the assembly of elements of the inner functional assembly.

The end structures (4.2, 4.3) of the second rotor (4) are integrally assembled on the shaft (5) by means of respective sleeves (12) and (13) attached thereto, whereas in the case of the first rotor (2), one end structure (2.2) thereof is integrally attached with respect to the shaft (5), through the same sleeve (12) for assembling the end structure (4.2) of the second rotor (4) or by means of a similar independent sleeve, whereas the other end structure (2.3) of this first rotor (2) is rotationally assembled by rolling means (14) with respect to the support (10) which is attached to the end cover (8) of the outer casing.

Additionally, one end structure (3.2) of the second stator (3) is arranged between the end structures (2.2) and (4.2) such that it can rotate with respect to the shaft (5) as a result of rolling means (15), which can be arranged directly on the shaft (5), when the end structures (2.2, 4.2) are linked to the shaft (5) by means of respective independent sleeves (12), whereas when said end structures (2.2, 4.2) are linked to the shaft (5) by means of a common sleeve (12), the rolling means (15) are arranged on said common sleeve (12), like in the embodiment depicted in FIG. 1. The other end structure (3.3) of the second stator (3) is in turn firmly assembled on the support (10) which is attached to the end cover (8) of the outer casing.

The winding (1.1) of the first stator (1) has a terminal (16) projecting outwards through the outer casing, whereas the winding (3.1) of the second stator (3) in turn has a terminal (17) projecting outwards through the assembly formed by the support (10) and the end cover (8); so said windings (1.1) and (3.1) can be electrically connected to external means without it affecting the generator or motor operation.

The partial cross section of FIG. 2 shows the rotation of the shaft (5) by means of a first arrow (A), the rotation of the first rotor (2) by means of a second arrow (B) and the rotation of the second rotor (4) by means of a third arrow (C), all of which coincide in the same direction.

Additionally, in the inner portion of the coaxial assembly made up of the cylindrical bodies (1.2, 2.4, 3.4, 4.4), there is arranged a cylinder (18) firmly attached to the cylindrical body (4.4) of the second rotor (4), said cylinder (18) being made of a ferromagnetic material like the outer casing of the generator, so the magnetic circuits of the magnets (2.1) of the first rotor (2) and of the magnets (4.1) of the second rotor (4) are closed through said inner cylinder (18) and the outer casing of the generator, preventing magnetic energy losses of the polar parts, thereby making better use of the magnetic fields on the windings (1.1) and (3.1) of the first stator (1) and of the second stator (3).

The structural assembly of the generator or motor is arranged on a support (19), whereby the generator or motor can be stably seated and firmly held in the place of installation.

Figure 3:
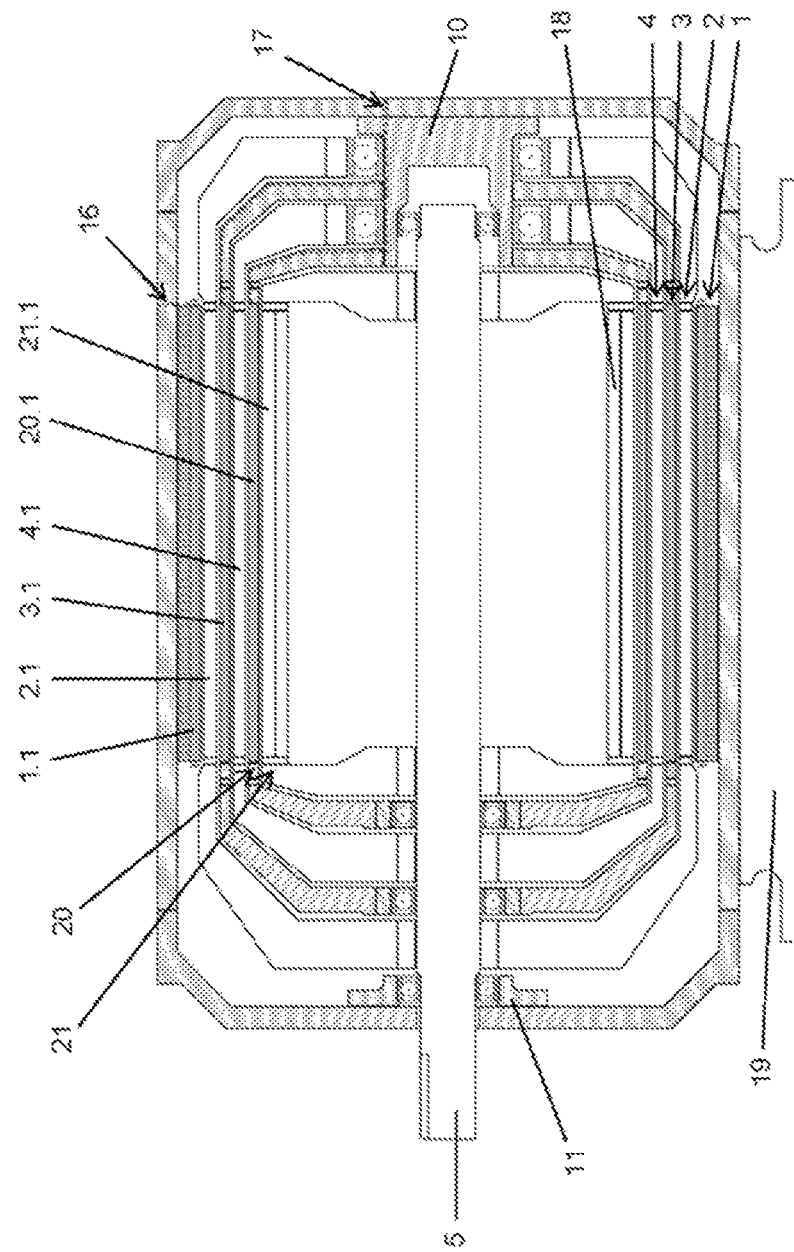
FIG. 3 shows a longitudinal section view of another embodiment of a rotary electric machine according to the invention.

Although the description has been made in relation to an embodiment provided with a double stator (1, 3) and double rotor (2, 4), the object of the invention is also valid, with the same features, in relation to arrangements comprising a larger number of stators and rotors. In this sense, FIGS. 3 and 4 depict, for example, an embodiment formed by three stators (1, 3, 20) and three rotors (2, 4, 21), according to an assembly made according to the object of the invention, i.e., in a concentric distribution, also having a cylinder (18) in the inner portion of the assembly, the third stator (20) being provided with a winding (20.1) and the third rotor (21) being provided with permanent magnets (21.1). The partial cross section of FIG. 4 shows the rotation of the third rotor (21) by means of a fourth arrow (D), which also coincides with the direction of rotation of the shaft (5).

Additionally, although according to a preferred embodiment the stators (1, 3) are provided with windings (1.1, 3.1) and the rotors (2, 4) are provided with permanent magnets (2.1, 4.1), the opposite can also be true, or both the stators (1, 3) and the rotors (2, 4) are provided with windings, the windings in turn acting as inductors connected to an external power supply, all these embodiments being comprised in the scope of the invention.

The invention claimed is:

1. A rotary electric machine, comprising:
   an outer casing made of a ferromagnetic material formed by a cylindrical central body and end covers and;
   a stator assembly;
   a rotor assembly arranged such that it rotates relatively with respect to the stator assembly; and
   a shaft on which the rotor assembly is assembled in an integrally rotating manner;
   wherein:
   the stator assembly comprises at least a first stator and a second stator; and
   the rotor assembly comprises at least a first rotor and a second rotor;
   in an arrangement such that the first stator, the first rotor, the second stator and the second rotor are arranged consecutively in a coaxial distribution;
   where the first rotor comprises a cylindrical body which incorporates permanent magnets and is attached at its ends to end structures, one end structure being firmly attached on the shaft by means of a sleeve, whereas the other end structure is rotationally attached to the outer casing by rolling means; and
   where the second stator comprises a cylindrical body which incorporates a winding and is attached at the ends to end structures, one end structure being rotationally attached to the shaft by rolling means, whereas the other end structure is firmly attached to the outer casing.

2. The rotary electric machine according to claim 1, wherein the first stator comprises a cylindrical body which incorporates a winding, said cylindrical body being fixed on the inner portion of the cylindrical central body of the outer casing.

3. The rotary electric machine according to claim 1, wherein the second rotor comprises a cylindrical body which incorporates permanent magnets and is attached at its ends to end structures, which are firmly attached on the shaft by means of respective sleeves and.

4. The rotary electric machine according to claim 1, wherein the shaft is rotationally assembled by rolling means on supports which are attached to the end covers and of the outer casing.

5. The rotary electric machine according to claim 1, wherein there is arranged inside the coaxial assembly formed by the cylindrical bodies a cylinder made of a ferromagnetic material, firmly attached to the cylindrical body of the second rotor.

* * * * *